(No Model.)

C. M. GRAHAM.
FENCING DEVICE.

No. 587,810. Patented Aug. 10, 1897.

Witnesses
Arthur Benning
S. E. Zimmerman

Inventor
Charles M. Graham
By W. W. Dudley & Co.
his Attorneys

UNITED STATES PATENT OFFICE.

CHARLES M. GRAHAM, OF JONESVILLE, VIRGINIA, ASSIGNOR OF ONE-HALF TO JAMES W. ORR AND GEORGE W. BLANKENSHIP, OF SAME PLACE.

FENCING DEVICE.

SPECIFICATION forming part of Letters Patent No. 587,810, dated August 10, 1897.

Application filed June 2, 1897. Serial No. 639,089. (No model.)

*To all whom it may concern:*

Be it known that I, CHARLES M. GRAHAM, a citizen of the United States, residing at Jonesville, in the county of Lee and State of Virginia, have invented certain new and useful Improvements in Fencing Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in devices for employment in building wire fencing, and has for its object the provision of a simply-constructed implement adapted for stretching wire, withdrawing staples, and like work incidental to fence-making, said implement possessing advantages in point of economy of construction, efficiency in operation, and durability, and added to these the implement, being light of weight, is susceptible of being readily carried from place to place and is easily manipulated.

The nature of my invention will clearly appear from a reading of the following detailed description when taken in connection with the accompanying drawings, in which—

Figure 1:
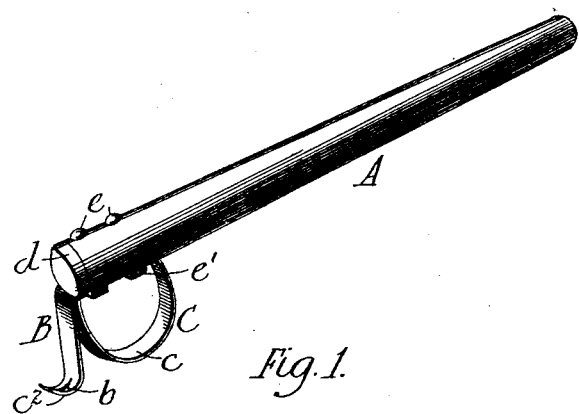
Figure 2:
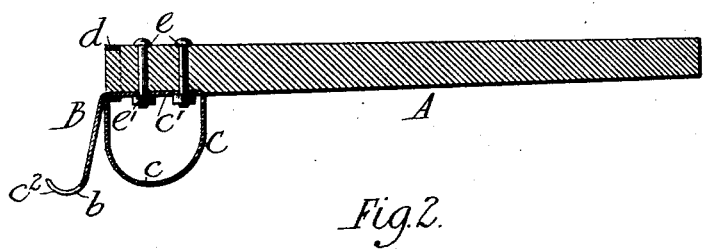

Figure 1 is a perspective view of my improved implement, and Fig. 2 is a horizontal sectional view.

Referring to the said drawings by letter, A denotes the handle portion of my improved implement, which is preferably made of hard wood and is circular in cross-section, diminishing in diameter toward one end. At the other end is secured the claw B and the fulcrum-piece C, the means employed for securing these parts being a ferrule $d$ and bolts $e\,e$, provided with nuts $e'\,e'$. For economy in construction and for lightness the claw and fulcrum-piece are constructed from strap metal, a single strip of this material being bent to the form of a half-circle, as at $c$, to provide a fulcrum-surface, and the strip is then bent back in a straight line, as at $c'$, for connection with the handle, and from this portion $c'$ the strip is bent down over the end of the strip, preferably at an obtuse angle to the portion $c'$, and terminates in a curved or rounded end $c^2$, which is slotted, as at $b$, to form the claw.

The end of the handle to which the above-described parts are secured is shouldered to receive the ferrule $d$, and for a distance equal to the length of the portion $c'$ the handle is cut away to provide a seat for said portion, and the latter and the handle are apertured to receive the bolts $e$, which project beyond the portion $c'$ or the handle sufficiently to receive the nuts $e'$, whereby the fulcrum-piece and claw are securely held to place. The bolt-and-nut connection is sufficiently secure for all purposes; but I prefer to pass the portion $c'$ through the ferrule $d$, as shown, and thus secure great strength at that point which is subjected to the most strain. The ferrule, in addition to the function just stated, prevents the handle from splitting either through the action of the bolts or through the strain imparted in operation.

The operation of my improved implement will be understood by those versed in the art. In tightening the wire in fence-making the wire is engaged by the claw and the fulcrum-piece is placed against the post and the handle moved around the latter, when it will be found that great power is exerted and the wire strand is stretched to the desired extent. The implement is also adapted for withdrawing staples, in which operation the staple is engaged by the claw, and the movement of the lever with the interposed fulcrum results in the withdrawal of the staple. The implement may also be employed in various other directions—as, for instance, in raising posts from their holes.

The peculiar form given to the fulcrum-piece permits of a considerable range of movement of the implement in operation as compared with the ordinary claw-bar, in which the side of the bar itself is employed as the fulcrum, and this feature of the invention materially adds to the degree of efficiency possessed.

I claim as my invention—

In a device of the character described, the combination with a handle portion provided with a ferrule, of a metal strip passed through the ferrule and secured to the handle portion by bolts and nuts, and bent rearwardly from such connection to the form of a half-circle to provide a fulcrum-piece, and bent forwardly from the ferrule at an angle to the handle portion, and terminating in a slotted and rounded end to provide a claw, all substantially as and for the purposes set forth.

In testimony whereof I affix my signature in presence of two witnesses.

CHARLES M. GRAHAM.

Witnesses:
JAMES W. ORR,
GEORGE W. BLANKENSHIP.